(No Model.)

J. D. TRAMMELL.
CAR TRUCK.

No. 314,402.  
Patented Mar. 24, 1885.

2 Sheets—Sheet 1.

WITNESSES:  
Thos. Houghton.  
W. X. Stevens

INVENTOR:  
J. D. Trammell  
BY Munn & Co.  
ATTORNEYS.

(No Model.)
2 Sheets—Sheet 2.
J. D. TRAMMELL.
CAR TRUCK.
No. 314,402. Patented Mar. 24, 1885.
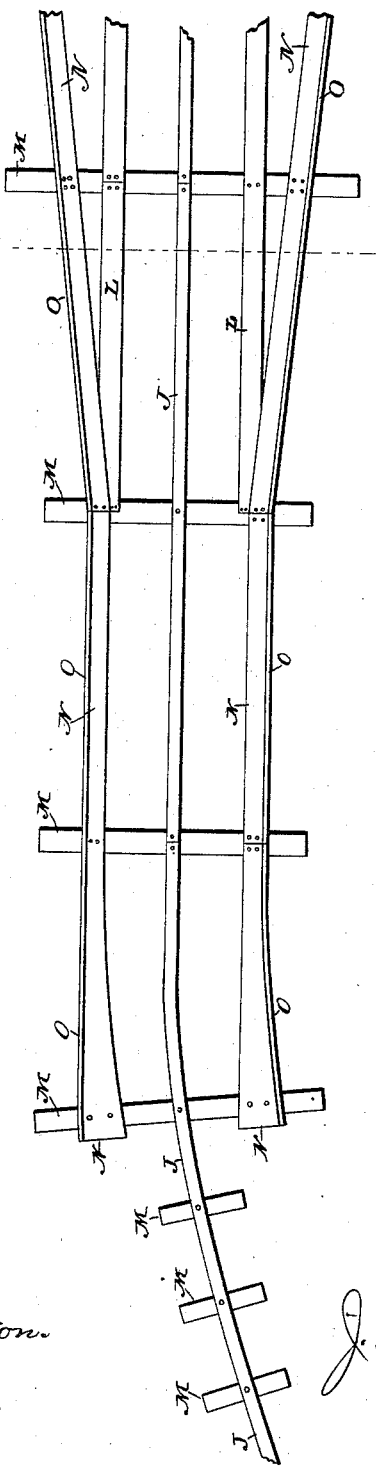
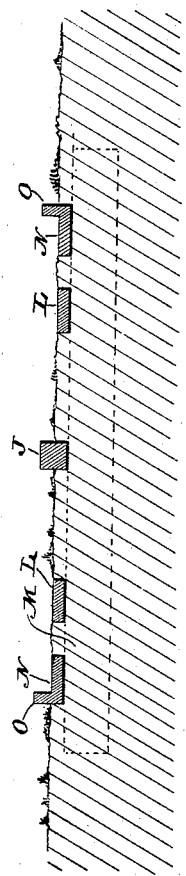
WITNESSES:
Thos. Houghton.
W. X. Stevens.
INVENTOR:
J. D. Trammell
BY Munn & Co.
ATTORNEYS.

UNITED STATES PATENT OFFICE.

JEFFERSON D. TRAMMELL, OF AUBURN, ALABAMA.

CAR-TRUCK.

SPECIFICATION forming part of Letters Patent No. 314,402, dated March 24, 1885.

Application filed January 17, 1885. (No model.)

*To all whom it may concern:*

Be it known that I, JEFFERSON DAVIS TRAMMELL, a citizen of the United States, residing at Auburn, in the county of Lee and State of Alabama, have invented a new and useful Improvement in Railway Systems, of which the following is a description.

This invention relates to car-trucks and car-tracks adapted therefor; and it has for its object to economize the construction of short-line railways, to avoid friction from flanges and on sharp curves, and to insure the cars following the tracks thereon.

To this end my invention consists in the construction and combination of parts forming a railway system, hereinafter described and claimed, reference being had to the accompanying drawings, in which—

Figure 1:
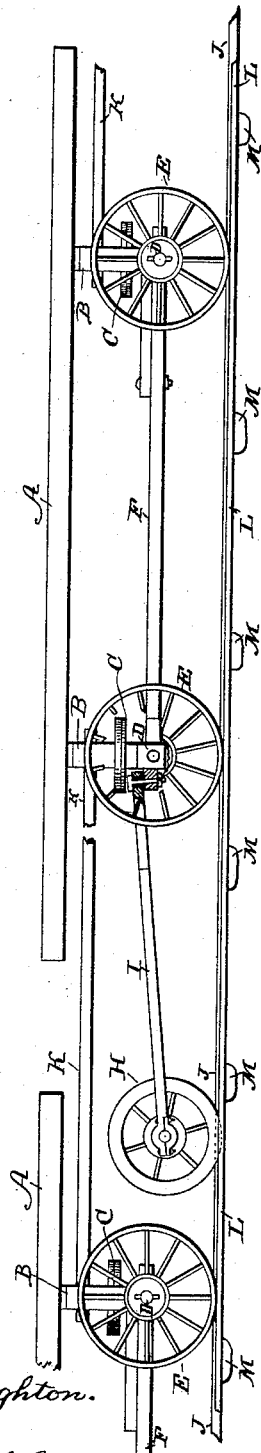
Figure 2:
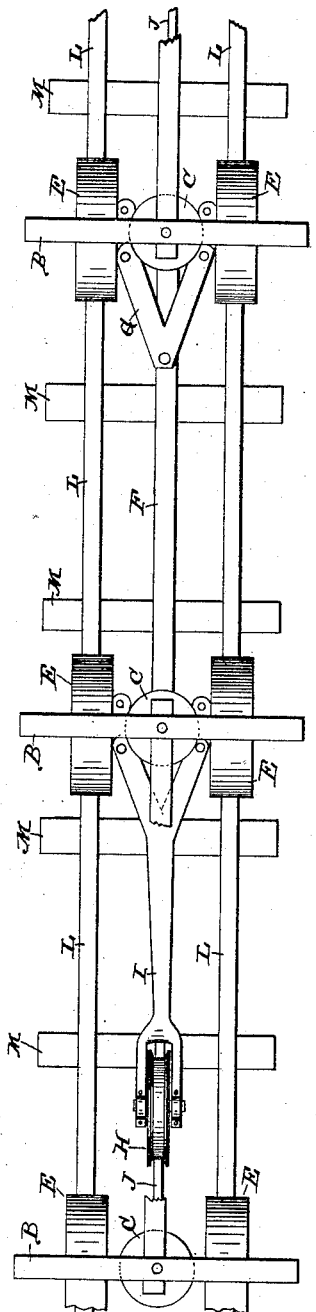

Figure 1 is a side elevation of a portion of a railroad and a portion of a car according to my invention. Fig. 2 is a plan view of the same without the car-body. Fig. 3 is a transverse vertical section of the track, and Fig. 4 is a detail of the track at sidings, yards, &c.

A represents the body of a car or wagon; B, the bolsters; C, the fifth-wheel; D, the axle, and E the car-wheels journaled to revolve on the axle. The car is mounted both fore and aft on its axles by means of fifth-wheel C, so that the axles may both turn thereon in order that they remain coincident with the radius of any curve on which the car is traveling, thereby maintaining the wheels in line with the track.

To direct the rear axle always into the position just described, I provide it with a reach, F, connected with the king-bolt of the forward fifth-wheel, C, and I rigidly brace the rear axle to the reach by means of hounds G. By this means the rear truck takes its lead and direction from the forward truck. The forward truck is provided with an independent leading-wheel, H, journaled in a tongue, I, and having two flanges to keep it upon a central track, J. This tongue is bifurcated at its forward end to receive the wheel H, and at its rear end for the purpose of forming a bracing attachment to the forward axle, D. This attachment is such as to permit a little vertical play of the tongue I without rocking the axle.

K is a link or reach freely connecting two cars by their king-bolts, so as to permit each car to follow the lead of its own wheel H.

The wheels E, on which the car is mounted, have broad flat rims without flanges, and the side tracks, L, are also broad and flat, and need not stand above the surface of the ground. In fact it is designed that the side tracks may be done away with on ground which is hard enough to support the engine and loaded cars on the broad-rimmed wheels described; but the guide-rail J is to be laid throughout the line of the road. Cross-ties M support all the rails, and being secured thereto, as usual, they keep the rails at proper distances apart. In any portion of the road where the side rails may be dispensed with the cross-ties M should be too short to enter the paths of the side wheels, E, as shown at the left in Fig. 4. The caster-wheel H is to be secured to the forward truck of the engine, to operate in the same manner, as on the cars described, and the drive-wheels of the engine may be constructed and operated in any usual manner, not requiring flanges. Where short turns and backings are to be made by the cars on sidings and yards and at stations, an extra set of side rails, N, Fig. 4, may be placed hopper-shaped, and be provided with flanges O for a sufficient distance to guide the side wheels upon the track. The rails of this road may be made of iron where the amount of traffic will warrant it, or they may be mere straps of iron spiked upon timbers, or the side rails may be logs flattened on the upper side. This makes a very cheap and efficient railway system for mining and timber regions and for general short branch roads. Either one or both side wheels may be mounted to turn on the axle. If only one wheel is loose, the axle will be journaled in bearings in the truck.

What I claim as my invention, and desire to secure by Letters Patent, is—

1. The combination, in a railway system, of cars mounted upon trucks, both fore and aft, by means of fifth-wheels, side wheels to each truck free to revolve independently of each other, a tongue extending forward of the forward truck, a two-flanged wheel journaled in the forward end of the tongue, a reach connecting the rear truck with the king-bolt of the forward truck, two wide flat-topped side rails and a narrow central rail secured upon the road, all substantially as described, for the purpose specified.

2. The combination of cars mounted on trucks by means of fifth-wheels, the trucks having broad-rimmed flat-faced supporting-wheels, a tongue extending forward of the car, a two-flanged guide-wheel journaled in the tongue, a single track of a width to enter between the flanges of the guide-wheel, and cross-timbers shorter than the space between the side truck-wheels lying in the ground and supporting the track, substantially as shown and described.

JEFFERSON D. TRAMMELL.

Witnesses:
W. C. DOWDELL,
J. J. PADGETT.